(12) United States Patent
Hidaka (10) Patent No.: US 7,339,990 B2
(45) Date of Patent: Mar. 4, 2008

(54) PROCESSING A RECEIVED SIGNAL AT A DETECTION CIRCUIT

(75) Inventor: Yasuo Hidaka, Cupertino, CA (US)

(73) Assignee: Fujitsu Limited, Kawasaki (JP)

( * ) Notice: Subject to any disclaimer, the term of this patent is extended or adjusted under 35 U.S.C. 154(b) by 665 days.

(21) Appl. No.: 10/360,103

(22) Filed: Feb. 7, 2003

(65) Prior Publication Data

US 2004/0156432 A1    Aug. 12, 2004

(51) Int. Cl.
H03H 7/30 (2006.01)
(52) U.S. Cl. ......................... 375/233; 375/348
(58) Field of Classification Search ........ 375/229–236, 375/348
See application file for complete search history.

(56) References Cited

U.S. PATENT DOCUMENTS

| | | | | |
|---|---|---|---|---|
| 4,186,384 | A * | 1/1980 | Acker | 341/143 |
| 5,153,875 | A * | 10/1992 | Takatori | 370/290 |
| 5,841,388 | A * | 11/1998 | Yasuda et al. | 341/155 |
| 6,226,323 | B1 * | 5/2001 | Tan et al. | 375/233 |
| 6,370,190 | B1 * | 4/2002 | Young et al. | 375/233 |
| 6,704,059 | B2 * | 3/2004 | Kim | 348/614 |
| 6,952,444 | B1 * | 10/2005 | Segal et al. | 375/232 |
| 2001/0043649 | A1 * | 11/2001 | Farjad-Rad | 375/229 |
| 2004/0021595 | A1 * | 2/2004 | Erdogan et al. | 341/144 |

OTHER PUBLICATIONS

David A. Johns and Daniel Essig, *Integrated Circuits for Data Transmission Over Twisted-Pair Channels*, IEEE Journal of Solid-State Circuits, vol. 32, No. 3, pp. 398-406, Mar. 1997.

Mohammed Hossein Shakiba, David A. Johns, and Kenneth W. Martin, *An Integrated 200-MHz 3.3-V BiCMOS Class-IV Partial-Response Analog Viterbi Decoder*, IEEE Journal of Solid-State Circuits, vol. 33 No. 1, pp. 61-75, Jan. 1998.

Kamran Azadet, Meng-Lin Yu, Patrik Larsson, David Inglis, *WA 18.3 A Gigabit Transceiver Chip Set for UTP CAT-6 Cables in Digital CMOS Technology*, IEEE International Solid-State Circuits Conference, 9 pages, 2000.

Patent Pending Application entitled "Equalizing A Signal For Transmission", by Yoichi Koyanagi, et al., 31 total pages, Jan. 30, 2003.

Patent Pending Application entitled "Method and System for Processing A Sampled Signal", by Yasuo (nmi) Hidaka, 39 total pages, Feb. 5, 2003.

Patent Pending Application entitled "Method and System for Providing Error Compensation To A Signal Using Feedback Control", by Yasuo (nmi) Hidaka, 42 total pages, Feb. 5, 2003.

(Continued)

*Primary Examiner*—Mohammed Ghayour
*Assistant Examiner*—Freshteh N Aghdam
(74) *Attorney, Agent, or Firm*—Baker Botts L.L.P.

(57) ABSTRACT

Processing a received signal includes receiving a signal having an analog form. The signal is sampled to yield sampled signals having an analog form. The following are repeated for each sampled signal. A feedback signal is generated from the sampled signal, and is converted from a digital form to an analog form. Correlation associated with the sampled signal is determined according to feedback signals generated from the sampled signals. The sampled signal having the analog form is adjusted in accordance with the correlation associated with the sampled signal in order to process the received signal.

27 Claims, 5 Drawing Sheets

OTHER PUBLICATIONS

Patent Pending Application entitled "Method and System for Signal Processing Using Vector Output From Scalar Data", by Yasuo (nmi) Hidaka, 40 total pages, Feb. 5, 2003.

Patent Pending Application entitled "Measuring A Signal Using A Programmable Gain Amplifier", by Yasuo Hidaka, 27 total pages, Feb. 7, 2003.

* cited by examiner

PROCESSING A RECEIVED SIGNAL AT A DETECTION CIRCUIT

TECHNICAL FIELD OF THE INVENTION

This invention relates generally to the field of data communcation and more specifically to processing a received signal at a detection circuit.

BACKGROUND OF THE INVENTION

Signals received at a receiver are typically processed to compensate for correlation in the received signals. As an example, adaptive equalization is performed in order to compensate for inter-symbol interference due to frequency-dependent channel loss. Known techniques for adaptive equalization have been used in the area of digital magnetic/optical recording and low speed digital communication such as modem and wireless communication. These techniques, however, use digital signal processing, which is relatively slow and inefficient. Consequently, known techniques for processing received signals are unsatisfactory for certain situations.

SUMMARY OF THE INVENTION

In accordance with the present invention, disadvantages and problems associated with previous techniques for processing received signals may be reduced or eliminated.

According to one embodiment of the present invention, processing a received signal includes receiving a signal having an analog form. The signal is sampled to yield sampled signals having an analog form. The following are repeated for each sampled signal. A feedback signal is generated from the sampled signal, and is converted from a digital form to an analog form. Correlation of the sampled signal with the feedback signals is determined according to feedback signals generated from the sampled signals. The sampled signal having the analog form is adjusted in accordance with the correlation associated with the sampled signal in order to process the received signal.

Certain embodiments of the invention may provide one or more technical advantages. A technical advantage of one embodiment may be that a receiver compensates for correlation using analog signal processing, which may provide for more efficient signal processing. The receiver performs analog processing on a received signal to yield an estimated correlation. The estimated correlation is subtracted from the received signal to compensate for the correlation.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
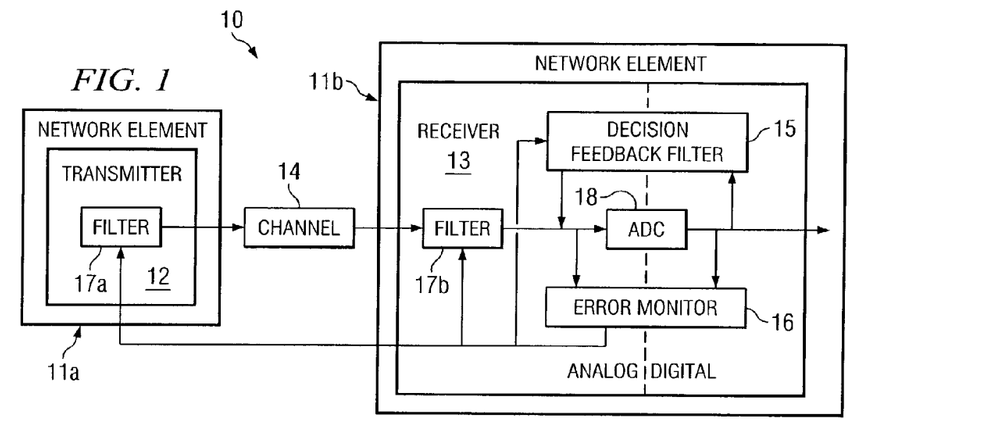
FIG. 1 is a block diagram illustrating one embodiment of a network that includes a receiver for processing a received signal.

FIG. 1 is a block diagram illustrating one embodiment of a network 10 that includes a receiver for processing a received signal. The receiver uses analog processing to estimate correlation and to measure error. The estimated correlation and measured error are used to adjust signals to compensate for the effects of distortion.

Network 10 includes network elements 11a-b and a channel 14 coupled as shown in FIG. 1. Network elements 11 may comprise elements that transmit and receive data such as servers, routers, computer systems, or any combination of the proceeding. Channel 14 may comprise a cable having a length in the range of ten to one hundred meters such as approximately twenty to forty meters. The speed of a signal traveling through channel 14 may be in the range of multi-gigabits per second such as approximately three gigabits per second. As an example, channel 14 may operate according to 10 Gigabit Attachment Unit Interface (XAUI) standards, which require a fixed frequency of 3.125 gigabits and is used for 10 Gigabit Ethernet.

Signals traveling at high speeds are susceptible to distortion resulting from a spread impulse response of channel 14. A received signal may suffer from frequency dependent distortions such as skin effect and dielectric loss. Frequency dependent distortion may result in interference such as inter-symbol interference (ISI). Multi-gigabit rate communication typically requires a high degree equalization over approximately twenty to forty dB to overcome inter-symbol interference. Known techniques use digital signal processing to compensate for the distortion. Digital signal processing, however, is typically slow and inefficient.

Network element 11a includes a transmitter 12, and network element 11b includes a receiver 13. Transmitter 12 transmits a signal through channel 14 to receiver 13. An analog-to-digital converter (ADC) 18 converts the compensated signal from an analog form to a digital form. A decision feedback filter 15 of receiver 13 may be used to compensate for inter-symbol interference. The compensation of inter-symbol interference may be performed by either decision-feedback equalization or partial-response equalization.

In decision-feedback equalization, decision feedback filter 15 estimates the interference, and the estimated interference is subtracted from the received signal. The expected interference estimates inter-symbol interference (ISI) from previous symbols. According to one embodiment, filter 17 may be used to compensate for pre-cursor interference that is not compensated by decision-feedback filter 15. Pre-cursor interference may comprise interference from future signals.

In partial-response equalization, decision-feedback filter 15 is used with a filter 17. Filter 17 may be realized as a filter 17a at transmitter 12, a filter 17b at receiver 13, or both. Filter 17 partially compensates for the distortion caused by the channel 14, and makes the overall characteristics of channel 14 and filter 17 a partial-response system, where the output of filter 17b includes specified controlled correlation between symbols. Decision-feedback filter 15 estimates the controlled correlation from the feedback signals, and the estimated correlation is subtracted from the received signal in a similar manner as in the decision-feedback equalization.

An error monitor 16 performs analog signal processing to measure an error from analog and digital forms of the received signal. The measured error comprises an amplitude error and residual correlation or interference due to imperfect filter parameters. The measured error may be used to adjust any or all of the parameters of decision-feedback filter 15, filters 17a and 17b, or any combination of the preceding.

The main difference between the decision-feedback equalization and the partial-response equalization is whether the correlation handled by decision-feedback filter 15 is controlled or not controlled. In the case of partial-response equalization, the correlation is controlled, and the parameters for decision-feedback filter 15 may be fixed to compensate for the controlled correlation. In the case of decision-feedback equalization, the correlation is not controlled. The correlation may comprise mainly interference caused by channel 14, and hence the parameters for the decision-feedback filter may be adjusted according to the characteristics of channel 14.

Any or all of the parameters of decision-feedback filter 15 and filters 17a and 17b may be fixed, user-programmable, or automatically adaptive using error measured by error monitor 16. Allocation of the filter characteristics among decision-feedback filter 15 and filters 17a and 17b is not limited to the above description of decision-feedback equalization and partial-response equalization, and may be modified without departing from the scope of the invention.

In the following description, allocation of the filter characteristics, such as for decision-feedback equalization or for partial-response equalization, is not distinguished unless otherwise stated. Decision-feedback filter 15 is just said to compensate for the correlation in the received signals. The correlation may refer to intersymbol interference for decision-feedback equalization or controlled correlation for partial-response equalization.

Error monitor 16 may perform subsampling to calculate the error at a slower rate than the sampling rate of receiver 13, which may allow for a more efficient link speed that is not limited by the speed of the error calculation. Since channel 14 typically remains unchanged with respect to time, the factors that affect the error also remain relatively constant. Accordingly, determining the error from the subsampled signal may provide an adequate measurement of the error.

An example of a detector having a decision feedback filter and an error monitor is described with reference to FIG. 2. An example of a detector having multiple detection circuits is described with reference to FIG. 3. A method for processing a received signal is described with reference to FIG. 4.

Figure 2:
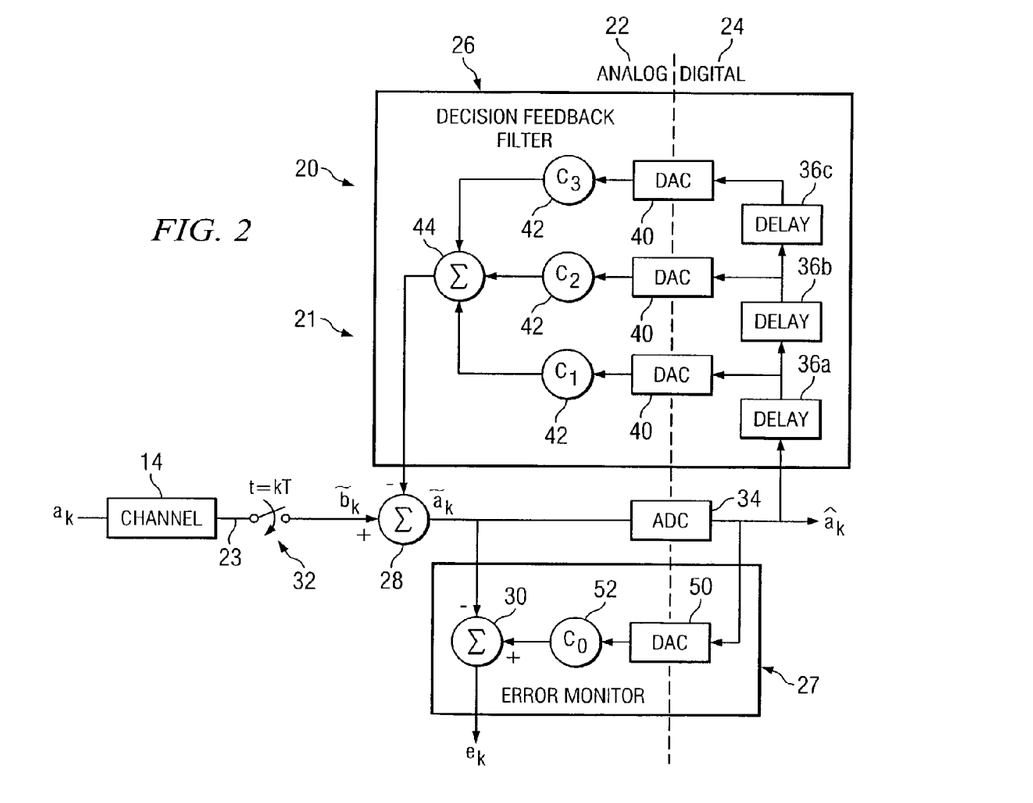
FIG. 2 is a block diagram of one embodiment of a detector having a detection circuit for processing a received signal.

FIG. 2 is a block diagram of one embodiment of a detector 20 having a detection circuit 21 for processing a signal. In general, a data sequence $a_k$ is transmitted through channel 14 to detector 20 at a receiver. Detection circuit 21 processes a sampled signal $\tilde{b}_k$ to generate recovered data sequence $\hat{a}_k$. Detection circuit 21 includes a decision feedback filter 26 and an error monitor 27. Decision feedback filter 26 performs analog processing on recovered data sequence $\hat{a}_k$ to determine an estimated correlation, and subtracts the estimated correlation from sampled signal $\tilde{b}_k$ to compensate for the correlation. Error monitor 27 performs analog processing to measure error $e_k$, which may be used to adjust filter parameters to adjust a signal.

According to the illustrated embodiment, data sequence $a_k$ is transmitted through channel 14 to detector 20. Channel 14 may comprise, for example, a cable having a length of approximately twenty to forty meters. Detector 20 includes an analog domain 22 and a digital domain 24. Analog domain 22 performs analog processing, and digital domain 24 performs digital processing. Detection circuit 21 of detector 20 includes an input 23, a sampling switch 32, a summing node 28, and an analog-to-digital converter (ADC) 34 coupled to decision feedback filter 26 and error monitor 27 as shown in FIG. 2.

Sampling switch 32 samples the received signal to yield a sampled signal $\tilde{b}_k$. The signal may be sampled at sampling time $t=kT$, where T represents a sampling period. Summing node 28 subtracts an estimated correlation generated by decision feedback filter 26 from sampled signal $\tilde{b}_k$ to yield an estimated data sequence $\tilde{a}_k$. Estimated data sequence $\tilde{a}_k$ represents the received signal that has been adjusted to compensate for correlation. Analog-to-digital converter (ADC) 34 processes estimated data sequence $\tilde{a}_k$ to yield recovered data sequence $\hat{a}_k$ by converting estimated data sequence $\tilde{a}_k$ from an analog form to a digital form, removing noise from estimated data sequence $\tilde{a}_k$, and performing slicing procedures to quantize the values of estimated data sequence $\tilde{a}_k$.

Decision feedback filter 26 performs analog processing on a feedback signal comprising recovered data sequence $\hat{a}_k$ to determine an estimated correlation. Decision feedback filter 26 includes delays 36, digital-to-analog converters (DACs) 40, coefficient circuits 42, and a summing node 44 coupled as shown in FIG. 2. A delay 36a receives recovered data sequence $\hat{a}_k$ and performs a delay procedure on recovered data sequence $\hat{a}_k$. Delays 36b-c perform subsequent delays on recovered data sequence $\hat{a}_k$.

Digital-to-analog converters (DACs) 40 convert the delayed signals from a digital form to an analog form. Coefficient circuits 42 adjust the converted signals according to filter coefficients $C_1$, $C_2$, and $C_3$. The filter coefficients $C_1$, $C_2$, and $C_3$ may be fixed, programmable, or adaptive. Although decision feedback filter 26 is shown as having three filter coefficients, decision feedback filter 26 may have any suitable number of filter feedback coefficients, which may be fixed or programmable. Summing node 44 sums the adjusted signals to generate the estimated correlation, which is subtracted from sampled signal $\tilde{b}_k$ to compensate for the correlation, yielding estimated data sequence $\tilde{a}_k$.

Error monitor 27 determines an error from analog estimated data sequence $\tilde{a}_k$ and from digital recovered data sequence $\tilde{a}_k$. Error monitor 27 includes a digital-to-analog converter (DAC) 50, a coefficient circuit 52, and a summing node 30 coupled as shown in FIG. 2. Digital-to-analog converter 50 converts recovered data sequence $\hat{a}_k$ from a digital form to an analog form. Coefficient circuit 52 adjusts the converted signal according to a filter coefficient $C_0$ to yield an expected data sequence. The filter coefficient $C_0$ may be fixed, programmable, or adaptive. Summing node 30 subtracts the estimated data sequence $\tilde{a}_k$ from the expected data sequence generated by coefficient circuit 52 to yield error $e_k$. That is, error $e_k$ represents the difference between an estimated data sequence and an expected data sequence.

Elements may be modified, added, or omitted without departing from the scope of the invention. For example, error monitor 27 may include subsampling switches that subsample the sampled signal in order to calculate the error at a subsampling rate slower than the sampling rate. Additionally, functions may be performed using software, hardware, other logic, or any suitable combination of the preceding.

Figure 3A:
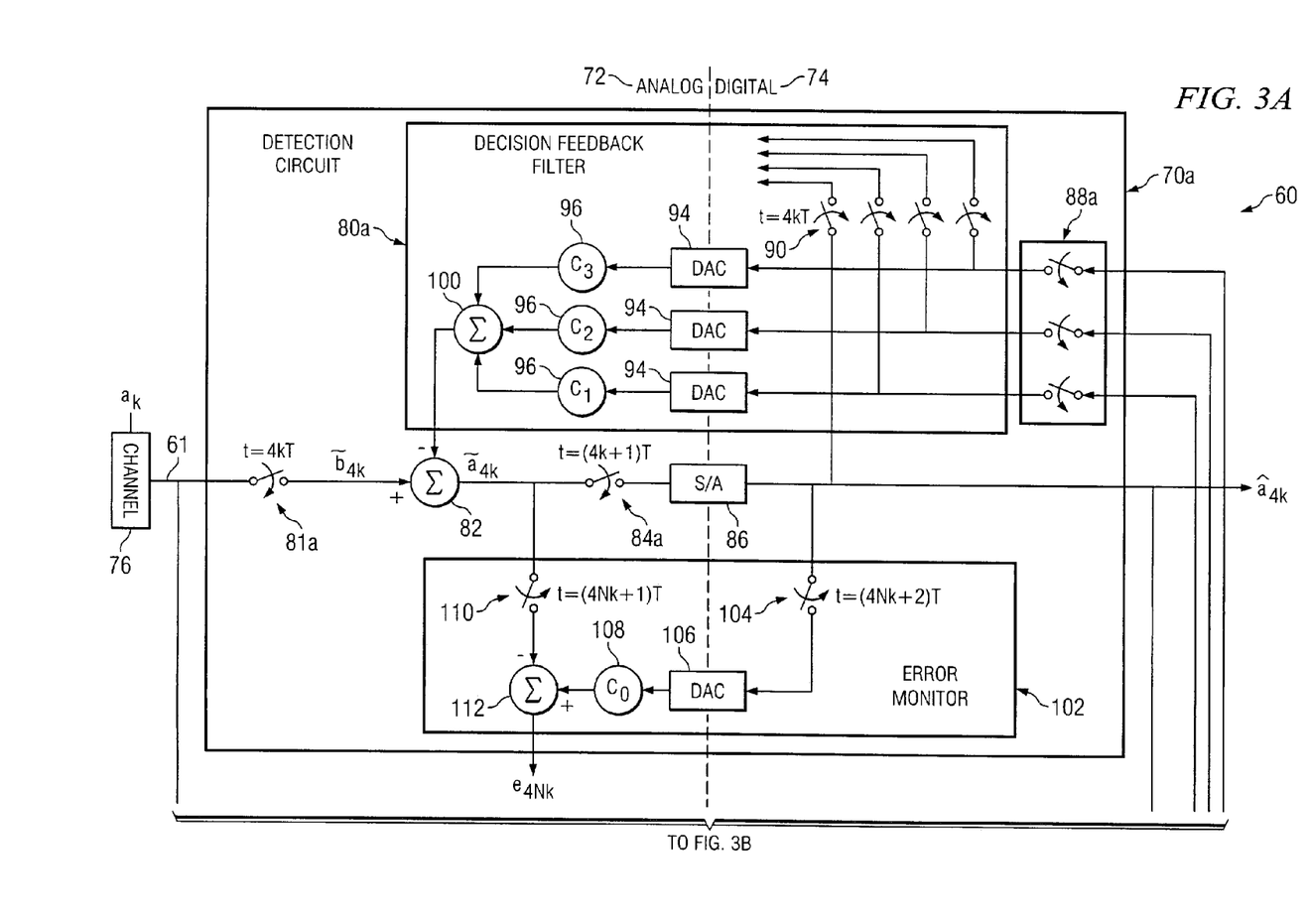
FIG. 3 is a block diagram of another embodiment of a detector having a plurality of detection circuits for processing a received signal.
Figure 3B:
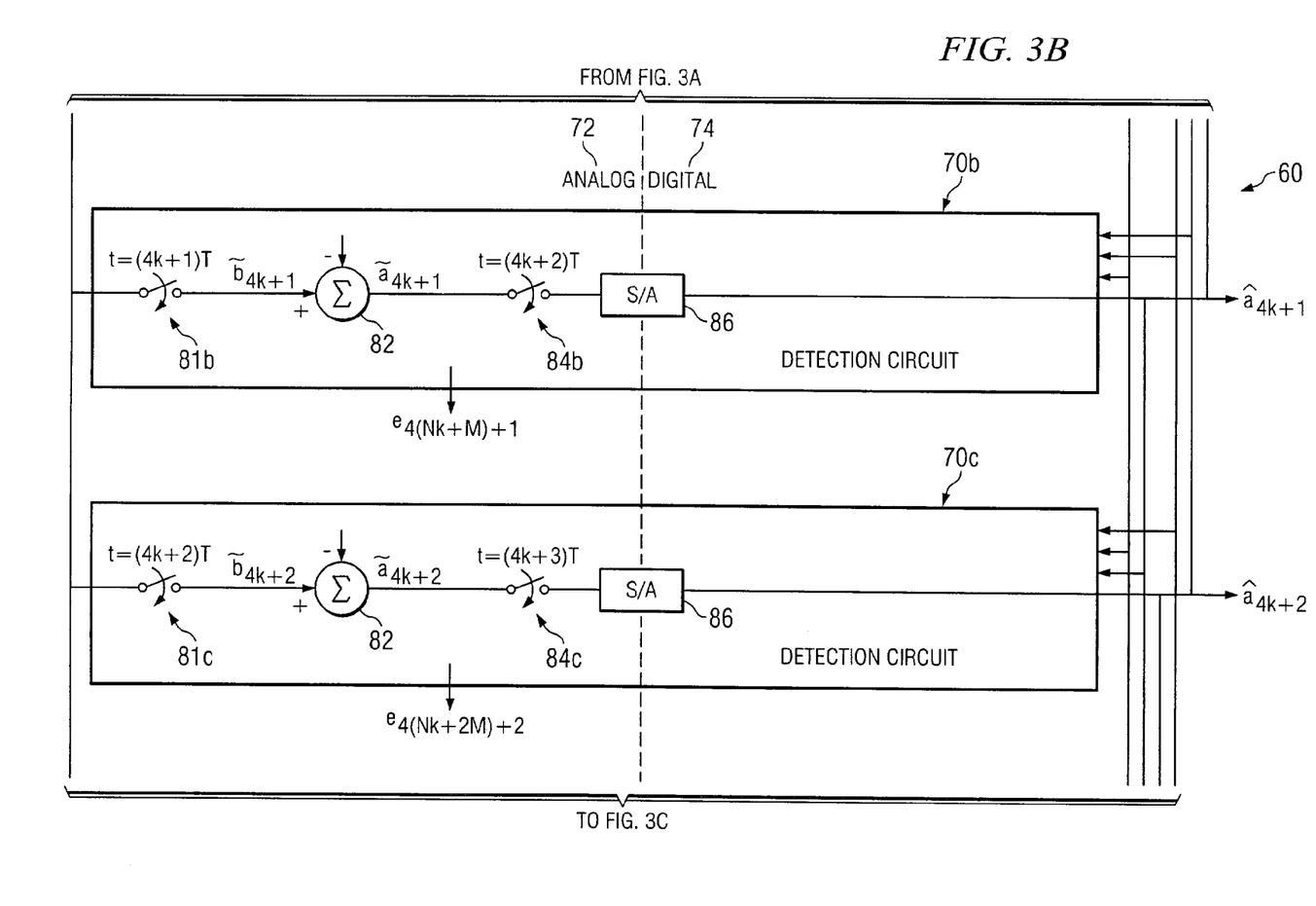
Figure 3C:
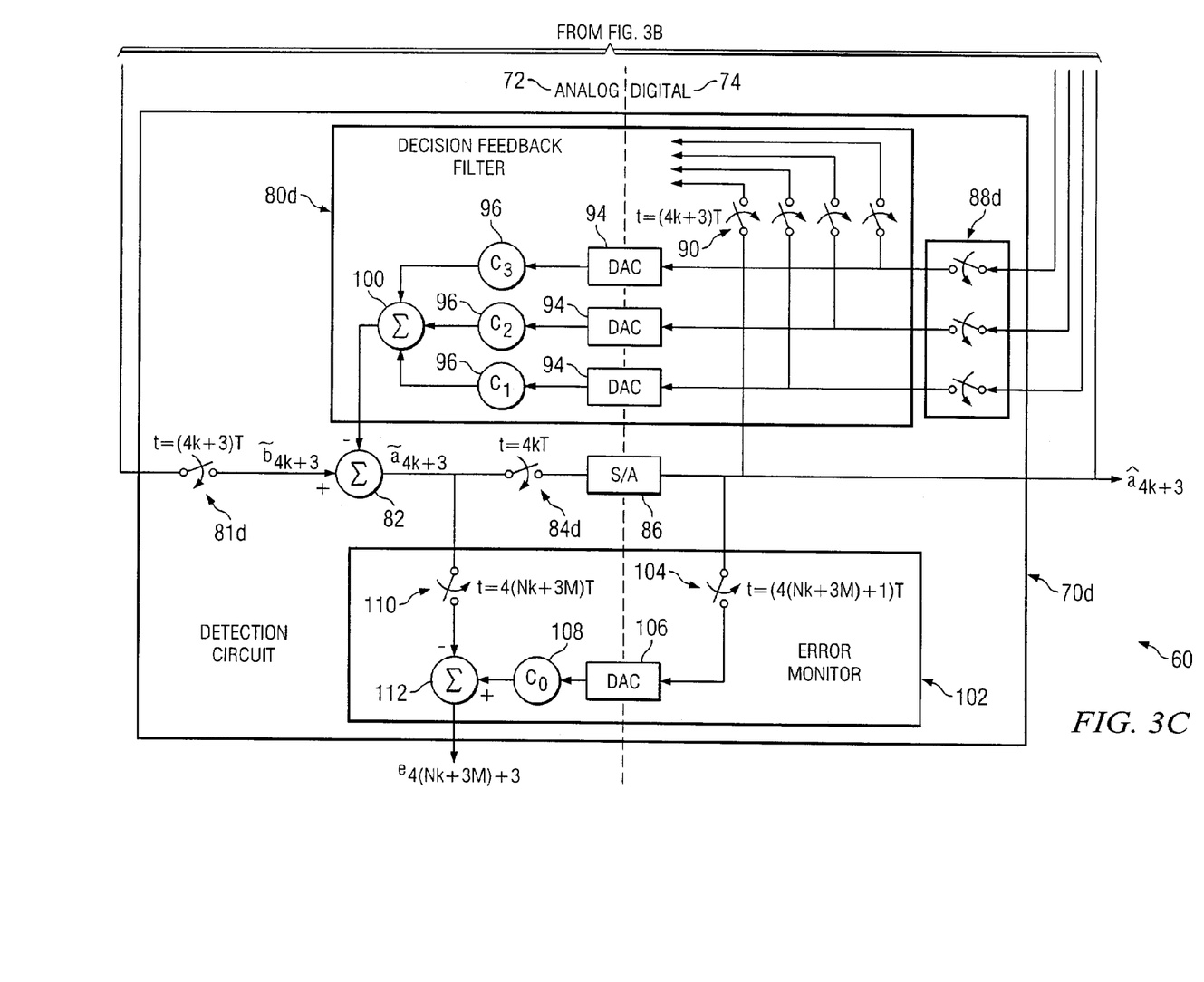

FIG. 3 is a block diagram of one embodiment of a detector 60 having multiple detection circuits 70a-d for processing a received signal. Detection circuits 70a-d are substantially similar and are coupled as shown in FIG. 3. To simplify FIG. 3, detection circuits 70b-c are shown in an abbreviated format. Each detection circuit 70 has an analog domain 72 and a digital domain 74, which perform analog processing and digital processing, respectively, to estimate correlation and measure error. As used in this document, "each" refers to each member of a set or each member of a subset of a set. The estimated correlation and measured error are used to adjust signals to compensate for the effects of distortion.

In general, a data sequence $a_k$ is transmitted through a channel 76 to detector 60 of a receiver. Each detection circuit 70 of detector 60 samples the received signal at different times to yield sampled signals, and may perform sampling at successive times. For example, a first detection circuit 70a samples the received signal, then a second detection circuit 70b samples the received signal, and so on. A decision feedback filter 80 of each detection circuit 70 receives feedback signals comprising recovered data sequences from the other detection circuits 70, and performs analog processing on the feedback signals to determine an estimated correlation. The estimated correlation is subtracted from the sampled signal to compensate for correlation.

Each detection circuit 70 outputs a recovered data sequence that corresponds to the sampling time of the detection circuit 70. For example, detection circuit 70a generates recovered data sequence $â_{4k}$ at sampling time t=4kT, and detection circuit 70b generates recovered data sequences $â_{4k+1}$ at sampling time t=(4k+1)T. A combined recovered data sequence $â_k$ may be generated from the recovered data sequences $a_{4k+i}$, i=0, 1, 2, and 3, generated by detection circuits 70a-d.

According to the illustrated embodiment, data sequence $a_k$ is transmitted through channel 76 to detection circuits 70a-d. Channel 76 may comprise, for example, a cable having a length of twenty to forty meters. A detection circuit 70 includes a decision feedback filter 80 and an error monitor 102. Decision feedback filter 80 performs analog processing on recovered data sequences received from other detection circuits 70 to calculate an estimated correlation. Although detector 60 is illustrated as having four detector circuits 70a-d, detector may include any suitable number of detector circuits 70. If the number of detection circuits 70 is a power of two, clock signals may be more readily provided to the detection circuits 70.

A detection circuit 70 may include an input 61, an input sampling switch 81, a summing node 82, a sampling switch 84, a sense amplifier (S/A) 86, and a latch 88 coupled to decision feedback filter 80 and error monitor 102 as shown in FIG. 3. Input sampling circuits 81 of detection circuits 70a-d sample the received signal at different sampling times. In the illustrated example, detection circuit 70a samples at sampling times t=4kT to yield sampled signal $b̃_{4k}$, detection circuit 70b samples at sampling times t=(4k+1)T to yield sampled signal $b̃_{4k+1}$, detection circuit 70c samples at sampling times t=(4k+2)T to yield sampled signal $b̃_{4k+2}$, and detection circuit 70d samples at sampling times t=(4k+3)T to yield sampled signal $b̃_{4k+3}$.

Summing node 82 subtracts the estimated correlation generated by decision feedback filter 80 to yield an estimated data sequence $ã_k$. Each detection circuit 70 generates an estimated data sequence $ã_k$ corresponding to the sampling time of the detection circuit 70. For example, detection circuit 70a generates estimated data sequence $ã_{4k}$ at sampling times t=4kT, and detection circuit 70b generates estimated data sequence $ã_{4k+1}$ at sampling times t=(4k+1)T.

Sampling switch 84 and sense amplifier (S/A) 86 digitize and remove noise from estimated data sequence $ã_k$ to generate recovered data sequence $â_k$. Sampling switch 84 provides clocking for sense amplifier 86. Sampling switch 84 samples estimated data sequence $ã_k$ at a sampling time corresponding to the sampling time at an input sampling switch 81 of a next detection circuit 70. For example, sampling switch 84a and input sampling switch 81b sample at sampling times t=(4k+1)T, sampling switch 84b and input sampling switch 81c sample at sampling times t=(4k+2)T, sampling switch 84c and input sampling switch 81d sample at sampling times t=(4k+3)T, and sampling switch 84d and input sampling switch 81a sample at sampling times t=4kT. Sampling circuits 84a-d may sample in this manner in order to provide decision feedback filters 80a-d with recovered data sequences sampled at the different sampling times.

Sense amplifier 86 converts estimated data sequence $ã_k$ from an analog form to a digital form and performs a slicing procedure on estimated data sequence $ã_k$ in order to generate recovered data sequence $â_k$. Sense amplifier 86 may allow for efficient generation of recovered data sequence $â_k$.

Latch 88 is in through mode (where the switch is on) when the associated sense amplifier 86 produces an output. In other words, the sense amplifier output is propagated through latch 88 without sampling delay. Latch 88 goes into hold mode (where the switch is off) before the associated sense amplifier 86 is pre-charged to prepare for the next sampling, because the sense amplifier output is lost once sense amplifier 86 is pre-charged. Latch 88 may be required if the output of the associated sense amplifier 86 does not remain until the output $ã_k$ of summing node 82 is sampled by switches 84 and 110 and the value of sense amplifier 86 is sampled by switch 90. Latch 88 is optional if the output of the associated sense amplifier 86 remains until the samplings have taken place. Latch 88 is optional in the digital domain, and may be placed at any suitable location. For example, latch 88 may be placed in the analog domain after digital-to-analog converter 94.

Decision feedback filter 80 receives feedback signals comprising recovered data sequences $â_k$ from other detection circuits 70, for example, detection circuit 70a receives recovered data sequences $â_k$ from detection circuits 70b-d. Correlation with previous symbols is determined from the feedback signals. For example, at detector circuit 70a, recovered data sequence $â_{4k+3}$ from 70d is used to determine correlation with the symbols from one period before, recovered data sequence $â_{4k+2}$ from detector circuit 70c is used to determine the correlation with symbols from two periods before, and the recovered data sequence $â_{4k+1}$ from detector circuit 70b is used to determine the correlation with symbols from three periods before.

Decision feedback filter 80 includes sampling switches 90, digital-to-analog converters (DACs) 94, coefficient circuits 96, and a summing node 100 coupled as shown in FIG. 3. Sampling switches 90 perform delay procedures on the feedback signals. Digital-to-analog converters 94 convert the feedback signals from a digital form to an analog form. Coefficient circuits 96 adjust the converted signals according to filter coefficients $C_1$, $C_2$, and $C_3$. The filter coefficients $C_1$, $C_2$, and $C_3$ may be fixed, programmable, or adaptive. Although decision feedback filters 80 are shown with three filter coefficients $C_1$, $C_2$, and $C_3$, decision feedback filter 80 may include any suitable number of filter coefficients, which may be fixed or programmable. Summing node 100 sums the adjusted signals to generate the estimated correlation.

Error monitor 102 determines an error from analog estimated data sequence $\tilde{a}_k$ and from digital recovered data sequence $\hat{a}_k$. Error monitor 102 includes a sampling switch 104, a digital-to-analog converter (DAC) 106, a coefficient circuit 108, a sampling switch 110, and a summing node 112 coupled as shown in FIG. 3. Sampling switches 110 and 104 may be used to subsample estimated data sequence $\tilde{a}_k$ and recovered data sequence $\hat{a}_k$, respectively.

In the illustrated example, sampling switches 104 and 110 of detection circuit 70a sample at sampling times t=(4Nk+1)T and t=(4Nk+2)T. The constant N represents the subsampling rate. The error is measured at every N sampled data. For example, if N is one, the error is measured at the same speed as the data transmission and switches 110 and 104 may be omitted. If N is greater than one, the error is measured at a slower rate than the data transmission. Calculating the error at a subsampling rate may allow for more efficient link speed that is not limited by the speed of the error calculation.

As illustrated at detection circuit 70d, a constant M may be used to adjust the phase of subsampling switches 104 and 110. Constant L represents the number of the decision circuits at receiver 60, for example, L is four in FIG. 3. If N and M are chosen so that N is prime to L, and M satisfies (L*M+1) mod N=0, where mod is the operator to calculate the residue, the subsampling of the error may be spaced evenly among multiple detection circuits 70. For example, if L is four, the subsampling may be realized by using N=31 and M=23.

Digital-to-analog converter 106 converts the subsampled signal from a digital form to an analog form. Coefficient circuit 108 adjusts the converted signal according to a filter coefficient $C_0$ to yield a signal that corresponds to an expected data sequence. The filter coefficient $C_0$ may be fixed, programmable, or adaptive. Subsampling switch 110 subsamples estimated data sequence $\tilde{a}_k$. Summing node 112 subtracts the estimated data sequence $\tilde{a}_k$ from the expected data sequence generated by coefficient module 108 in order to yield the error. That is, the error represents the difference between the estimated data sequence $\tilde{a}_k$ and the expected data sequence $\hat{a}_k$ after removal of noise.

Elements may be modified, added, or omitted without departing from the scope of the invention. For example, the operations of sampling switch 84, sense amplifier 86, and latch 88 may be performed by an analog-to-digital converter. As another example, subsampling switches 104 and 110 may be omitted to allow for calculation of the error at a sampling rate instead of at a subsampling rate. Additionally, functions may be performed using software, hardware, other logic, or any suitable combination of the preceding.

Figure 4:
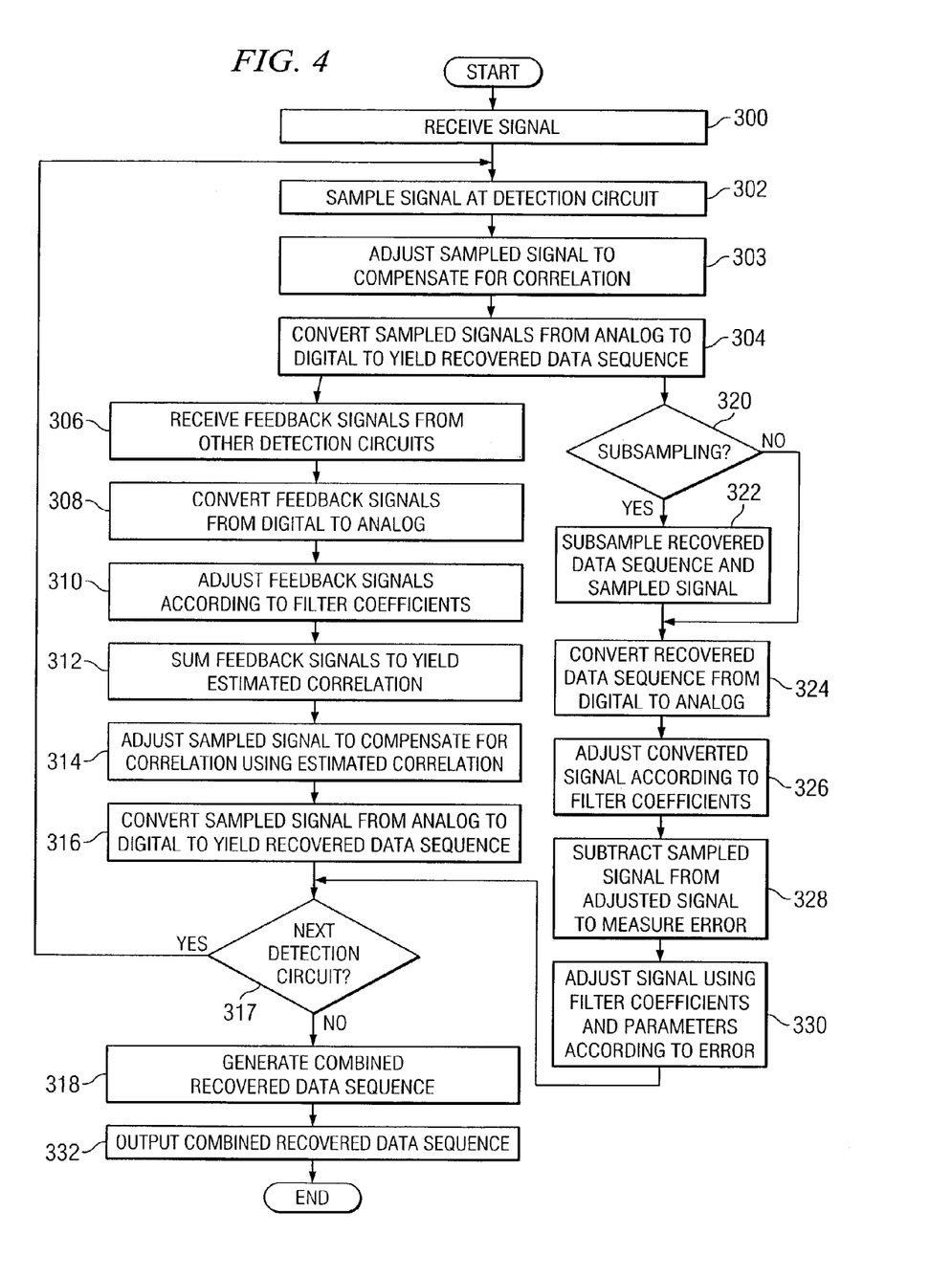
FIG. 4 is a flowchart illustrating one embodiment of a method for processing a received signal.

FIG. 4 is a flowchart illustrating one embodiment of a method for processing a received signal. The method begins at step 300, where detector 60 receives a signal transmitted through channel 76. An input sampling switch 81 of detection circuit 70 samples the received signal at specific sampling times at step 302. The sampled signal is adjusted to compensate for correlation at step 303. Sense amplifier 86 converts the sampled signal from an analog form to a digital form to yield a recovered data sequence at step 304.

Decision feedback filter 80 receives feedback signals comprising recovered data sequences from the other detection circuits 70 at step 306. Digital-to-analog converters 94 convert the recovered data sequences from a digital form to an analog form at step 308. By converting the signals to an analog form, the estimated correlation may be calculated using analog signal processing, which may be more efficient than digital signal processing. Coefficient circuits 96 adjust the signals according to filter coefficients at step 310.

Summing node 100 sums the signals to yield an analog signal representing the estimated correlation at step 312. Summing node 82 adjusts the received sampled signal to compensate for correlation at step 314 by subtracting the estimated correlation from the sampled signal. Sense amplifier 86 converts the sampled signal from an analog form to a digital form at step 316 to yield a recovered data sequence. If there is a next detection circuit 70 at step 317, the method returns to step 302, where the next detection circuit 70 samples the signal. A detection circuit 70 may perform steps 302 through 316 substantially simultaneously with another detection circuit 70 performing steps 302 through 316. If there is no next detection circuit 70 at step 317, the method proceeds to step 318.

Steps 320 through 330 may be performed substantially simultaneously with steps 306 through 316 at a detection circuit 70. If the error is to be measured at a subsampling rate at step 320, the method proceeds to step 322. At step 322, subsampling switches 104 and 110 subsample the sampled signal, and the method proceeds to step 324. If the error is not to be measured at the subsampling rate at step 320, the method proceeds directly to step 324.

At step 324, digital-to-analog converter 106 converts the recovered data sequence from a digital form to an analog form. Measuring the error using analog signal processing may be more efficient than using digital signal processing. Coefficient circuit 108 adjusts the converted signal according to a filter coefficient at step 326. Summing node 112 subtracts the sampled signal from the adjusted signal at step 328 to measure the error. Any or all of the filter coefficients and parameters may be adjusted to adjust the signal according to the error at step 330. A combined recovered data sequence is generated from the recovered data sequences at step 318. The combined recovered data sequence is output at step 332. After outputting the combined recovered data sequence, the method terminates.

Steps may be modified, added, or omitted without departing from the scope of the invention. Additionally, steps may be performed in any suitable order without departing from the scope of the invention. For example, generating the combined recovered data sequence at step 318 may be performed substantially simultaneously with the conversion of the sampled signal from an analog form to a digital form at step 316.

Certain embodiments of the invention may provide one or more technical advantages. A technical advantage of one embodiment may be that a receiver compensates for correlation using analog signal processing, which may provide for more efficient signal processing. The receiver performs analog processing on a received signal to yield an estimated correlation. The estimated correlation is subtracted from the received signal to compensate for the correlation.

Although an embodiment of the invention and its advantages are described in detail, a person skilled in the art could make various alterations, additions, and omissions without departing from the spirit and scope of the present invention as defined by the appended claims.

What is claimed is:

1. A method for processing a signal, comprising:
   receiving a signal having an analog form;
   sampling the received signal in the analog form at one or more sampling times to yield one or more sampled signals, each sampled signal having an analog form;

repeating the following for each sampled signal of the one or more sampled signals:
  generating a feedback signal from the sampled signal, the feedback signal having a digital form;
  converting the feedback signal from the digital form to an analog form;
  determining correlation associated with the sampled signal according to one or more feedback signals in the analog form generated from the one or more sampled signals; and
  adjusting the sampled signal having the analog form in accordance with the correlation associated with the sampled signal in order to process the received signal; and
repeating the following for each sampled signal of the one or more sampled signals:
  filtering pre-cursor interference from the received signal in accordance with an error determined using the feedback signal having the analog form.

2. The method of claim 1, further comprising repeating the following for each sampled signal of the one or more sampled signals:
  determining the error associated with the sampled signal using the feedback signal having the analog form; and
  adjusting the sampled signal having the analog form in accordance to the error.

3. The method of claim 1, further comprising repeating the following for each sampled signal of the one or more sampled signals:
  subsampling the sampled signal; and
  determining the error associated with the sampled signal using the subsampled signal.

4. The method of claim 1, wherein sampling the received signal at one or more sampling times comprises sampling the received signal at one or more detection circuits, each detection circuit sampling at a different sampling time.

5. The method of claim 1, wherein determining correlation associated with the sampled signal comprises:
  adjusting the one or more feedback signals having the analog form according to a plurality of filter coefficients, each feedback signal associated with a filter coefficient of the plurality of filter coefficients; and
  determining the correlation associated with the sampled signal according to the adjusted one or more feedback signals.

6. The method of claim 1, wherein determining correlation associated with the sampled signal comprises:
  adjusting the one or more feedback signals having the analog form according to a plurality of filter coefficients;
  summing the adjusted one or more feedback signals; and
  determining the correlation associated with the sampled signal according to the summed one or more feedback signals.

7. The method of claim 1, wherein adjusting the sampled signal having the analog form comprises subtracting the correlation associated with the sampled signal from the sampled signal having the analog form.

8. A receiver for processing a signal, comprising:
  an input operable to receive a signal having an analog form;
  one or more sampling switches operable to sample the received signal in the analog form at one or more sampling times to yield one or more sampled signals, each sampled signal having an analog form;
  one or more detection circuits, each detection circuit operable to repeat the following for a sampled signal of the one or more sampled signals:
    generate a feedback signal from the sampled signal, the feedback signal having a digital form;
    convert the feedback signal from the digital form to an analog form;
    determine correlation associated with the sampled signal according to one or more feedback signals in the analog form generated from the one or more sampled signals; and
    adjust the sampled signal having the analog form in accordance with the correlation associated with the sampled signal in order to process the received signal; and
  a filter operable to repeat the following for each sampled signal of the one or more sampled signals:
    filter pre-cursor interference from the received signal in accordance with an error determined using the feedback signal having the analog form.

9. The receiver of claim 8, wherein each detection circuit is further operable to repeat the following for a sampled signal of the one or more sampled signals:
  determine the error associated with the sampled signal using the feedback signal having the analog form; and
  adjust the sampled signal having the analog form in accordance to the error.

10. The receiver of claim 8, wherein each detection circuit is further operable to repeat the following for a sampled signal of the one or more sampled signals:
  subsample the sampled signal; and
  determine the error associated with the sampled signal using the subsampled signal.

11. The receiver of claim 8, wherein each detection circuit samples at a different sampling time.

12. The receiver of claim 8, wherein the detection circuit is operable to determine correlation associated with the sampled signal by:
  adjusting the one or more feedback signals having the analog form according to a plurality of filter coefficients, each feedback signal associated with a filter coefficient of the plurality of filter coefficients; and
  determining the correlation associated with the sampled signal according to the adjusted one or more feedback signals.

13. The receiver of claim 8, wherein the detection circuit is operable to determine correlation associated with the sampled signal by:
  adjusting the one or more feedback signals having the analog form according to a plurality of filter coefficients;
  summing the adjusted one or more feedback signals; and
  determining the correlation associated with the sampled signal according to the summed one or more feedback signals.

14. The receiver of claim 8, wherein the detection circuit is operable to adjust the sampled signal having the analog form by subtracting the correlation associated with the sampled signal from the sampled signal having the analog form.

15. A logic for processing a signal, the logic embodied in a medium and operable to:
  receive a signal having an analog form;
  sample the received signal in the analog form at one or more sampling times to yield one or more sampled signals, each sampled signal having an analog form;

repeat the following for each sampled signal of the one or more sampled signals:
  generate a feedback signal from the sampled signal, the feedback signal having an digital form;
  convert the feedback signal from the digital form to an analog form;
  determine correlation associated with the sampled signal according to one or more feedback signals in the analog form generated from the one or more sampled signals; and
  adjust the sampled signal having the analog form in accordance with the correlation associated with the sampled signal in order to process the received signal; and
repeat the following for each sampled signal of the one or more sampled signals:
  filter pre-cursor interference from the received signal in accordance with an error determined using the feedback signal having the analog form.

16. The logic of claim 15, further operable to repeat the following for each sampled signal of the one or more sampled signals:
  determine the error associated with the sampled signal using the feedback signal having the analog form; and
  adjust the sampled signal having the analog form in accordance to the error.

17. The logic of claim 15, further operable to repeat the following for each sampled signal of the one or more sampled signals:
  subsample the sampled signal; and
  determine the error associated with the sampled signal using the subsampled signal.

18. The logic of claim 15, operable to sample the received signal at one or more sampling times by sampling the received signal at one or more detection circuits, each detection circuit sampling at a different sampling time.

19. The logic of claim 15, operable to determine correlation associated with the sampled signal by:
  adjusting the one or more feedback signals having the analog form according to a plurality of filter coefficients, each feedback signal associated with a filter coefficient of the plurality of filter coefficients; and
  determining the correlation associated with the sampled signal according to the adjusted one or more feedback signals.

20. The logic of claim 15, operable to determine correlation associated with the sampled signal by:
  adjusting the one or more feedback signals having the analog form according to a plurality of filter coefficients;
  summing the adjusted one or more feedback signals; and
  determining the correlation associated with the sampled signal according to the summed one or more feedback signals.

21. The logic of claim 15, operable to adjust the sampled signal having the analog form by subtracting the correlation associated with the sampled signal from the sampled signal having the analog form.

22. A system for processing a signal, comprising:
  means for receiving a signal having an analog form;
  means for sampling the received signal in the analog form at one or more sampling times to yield one or more sampled signals, each sampled signal having an analog form;
  means for repeating the following for each sampled signal of the one or more sampled signals:
    generating a feedback signal from the sampled signal, the feedback signal having a digital form;
    converting the feedback signal from the digital form to an analog form;
    determining correlation associated with the sampled signal according to one or more feedback signals in the analog form generated from the one or more sampled signals; and
    adjusting the sampled signal having the analog form in accordance with the correlation associated with the sampled signal in order to process the received signal; and
  means for repeating the following for each sampled signal of the one or more sampled signals:
    filtering pre-cursor interference from the received signal in accordance with an error determined using the feedback signal having the analog form.

23. A method for processing a signal, comprising:
  receiving a signal having an analog form;
  filtering pre-cursor interference from the received signal at a filter separate from one or more detection circuits;
  sampling the received signal at the one or more detection circuits at one or more sampling times to yield one or more sampled signals, each sampled signal having an analog form, and sampling the received signal in the analog form at one or more detection circuits, each detection circuit sampling at a different sampling time; and
  repeating the following for each sampled signal of the one or more sampled signals:
    generating a feedback signal from the sampled signal, the feedback signal having a digital form, and converting the feedback signal from the digital form to an analog form;
    determining correlation associated with the sampled signal according to one or more feedback signals in the analog form generated from the one or more sampled signals by adjusting the one or more feedback signals having the analog form according to a plurality of filter coefficients, each feedback signal in the analog form associated with a filter coefficient of the plurality of filter coefficients, by summing the adjusted one or more feedback signals in the analog form, and by determining the correlation associated with the sampled signal according to the summed one or more feedback signals in the analog form;
    adjusting the sampled signal having the analog form in accordance with the correlation associated with the sampled signal by subtracting the correlation associated with the sampled signal from the sampled signal having the analog form; and
    subsampling the sampled signal, determining the error associated with the sampled signal using the subsampled signal, and adjusting the sampled signal having the analog form in accordance to the error in order to process the received signal; and
  repeating the following for each sampled signal of the one or more sampled signals:
    filtering pre-cursor interference from the received signal in accordance with the error determined using the feedback signal having the analog form.

24. The method of claim 1, wherein:
  filtering pre-cursor interference comprises filtering the pre-cursor interference from the received signal at a filter separate from one or more detection circuits; and
  sampling the received signal in the analog form at one or more sampling times to yield one or more sampled signals comprises sampling the received signal in the analog form at the one or more detection circuits.

25. The receiver of claim 8, further comprising a filter operable to compensate for pre-cursor interference in the received signal, the filter separate from the one or more detection circuits.

26. The logic of claim 15, further operable to:
filter pre-cursor interference from the received signal at a filter separate from one or more detection circuits; and
sample the received signal in analog form at the one or more detections circuits at one or more sampling times to yield one or more sampled signals, each sampled signal having an analog form.

27. The system of claim 22, further comprising:
means for filtering pre-cursor interference from the received signal; and
wherein the means for repeating is separate from the means for filtering.

* * * * *

UNITED STATES PATENT AND TRADEMARK OFFICE
CERTIFICATE OF CORRECTION

PATENT NO.        : 7,339,990 B2                                            Page 1 of 1
APPLICATION NO.   : 10/360103
DATED             : March 4, 2008
INVENTOR(S)       : Yasuo Hidaka It is certified that error appears in the above-identified patent and that said Letters Patent is hereby corrected as shown below:

Column 5, Line 37, after "sequences" delete "a" and insert -- â --.

Signed and Sealed this

Eighteenth Day of November, 2008

JON W. DUDAS
*Director of the United States Patent and Trademark Office*